Oct. 19, 1954     D. LABINO     2,692,220
METHOD FOR MAKING GLASS PAPER
Filed Nov. 19, 1951     2 Sheets-Sheet 1
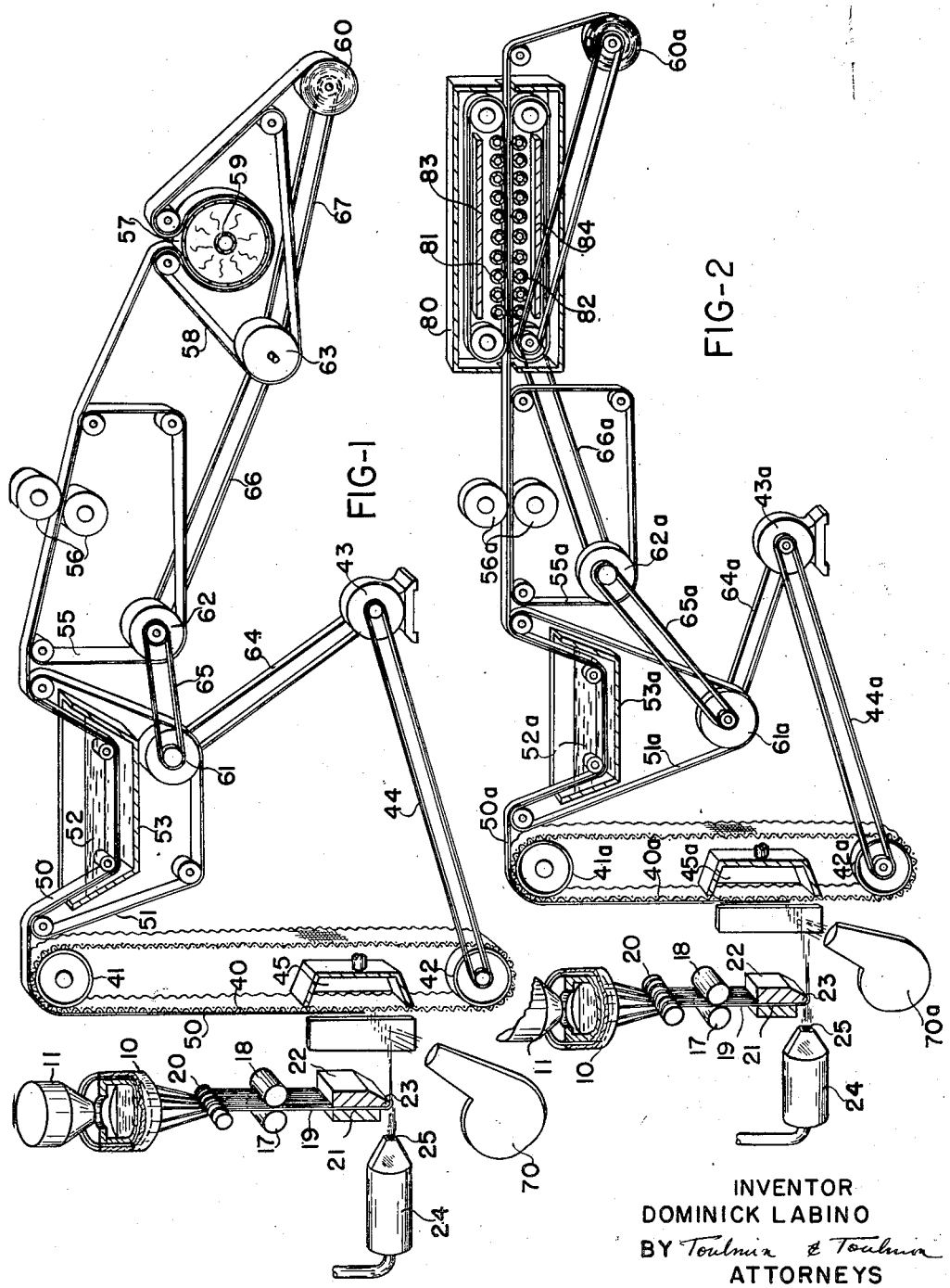
INVENTOR
DOMINICK LABINO
BY Toulmin & Toulmin
ATTORNEYS Oct. 19, 1954  D. LABINO  2,692,220
METHOD FOR MAKING GLASS PAPER
Filed Nov. 19, 1951  2 Sheets-Sheet 2
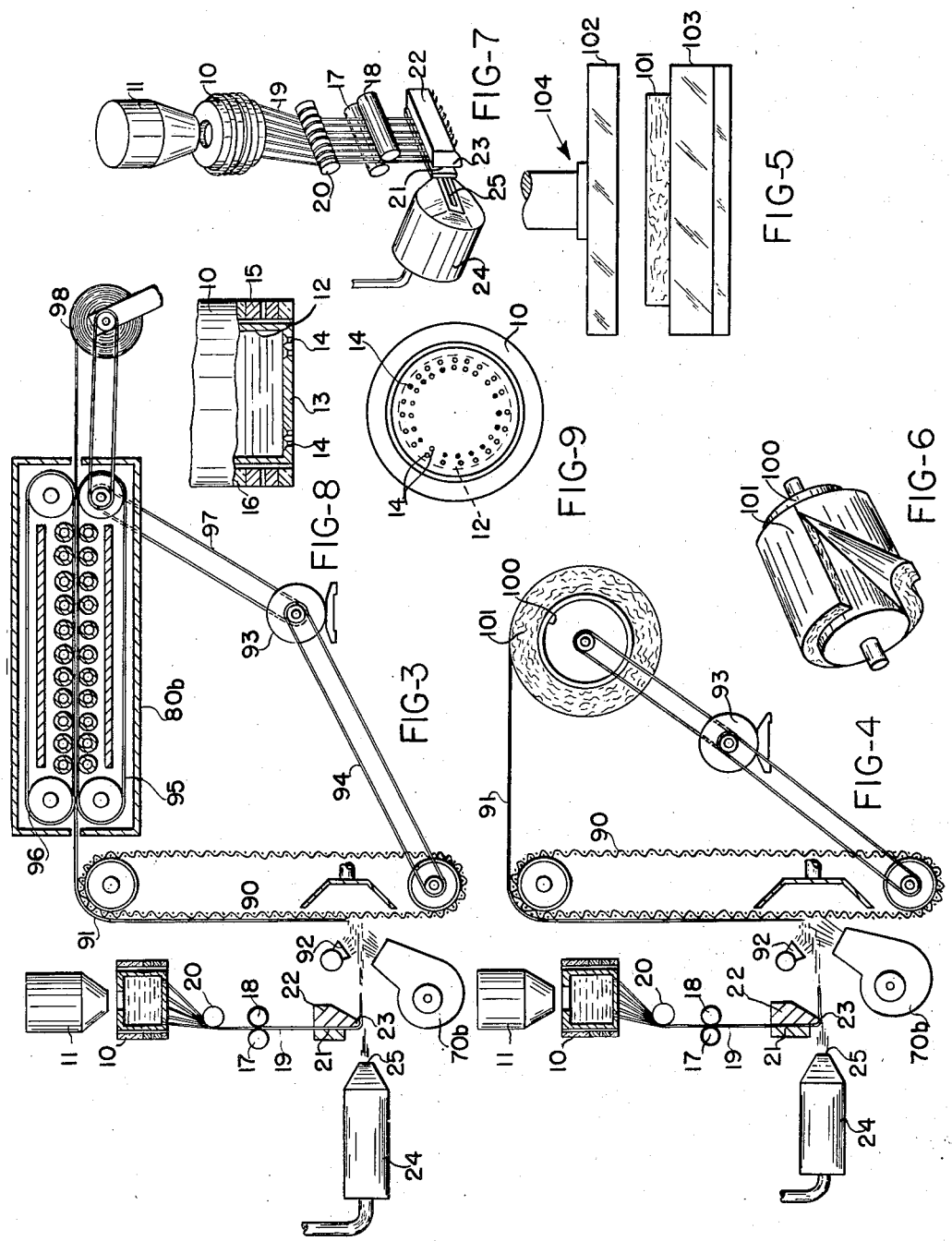
INVENTOR
DOMINICK LABINO
BY Toulmin & Toulmin
ATTORNEYS Patented Oct. 19, 1954

2,692,220

UNITED STATES PATENT OFFICE 2,692,220

METHOD FOR MAKING GLASS PAPER

Dominick Labino, Waterville, Ohio, assignor to Glass Fibers, Inc., Toledo, Ohio, a corporation of Ohio Application November 19, 1951, Serial No. 256,977

4 Claims. (Cl. 154—101)

This invention relates to methods for producing as a new article of manufacture a glass paper.

Paper consisting of glass fiber has heretofore been unknown in the art except as disclosed in my co-pending application Serial Number 247,019 filed September 17, 1951. Attempts made to produce glass paper have resulted in failure because of the failure of the glass fibers to mat or felt in the manner of the well known cellulose paper pulp fibers and other natural fibers resulting in a lack of tensile strength in the material produced which rendered it useless as a paper in the many uses to which paper is adapted. Further, the material produced lacked surface finish and hardness, making it unsuitable for use as paper.

However, I have discovered that fine glass fibers of uniform diameter, on the order of one micron and less, mat or felt together with self-adhesion which can be accentuated by proper methods of treating the fiber to an extent that good tensile strength is imparted to the product produced and that a smooth, hard surface finish can be given to the material, thereby making it satisfactory for use as paper. With the glass fibers having uniformity of diameter and uniformity of length, extreme uniformity of the paper is obtained.

Paper made of glass fibers according to this invention has characteristics that are not capable of reproduction in papers made from natural fibers, thus making glass paper adaptable for special purpose applications in which papers made from natural fibers cannot be used. For example, electronic components in which insulating papers are used are limited to a top temperature value of about 85° C., principally because of the destruction of the paper base of the component under heat. Thus, a paper made of glass fibers will permit of higher temperature elevation of electronic components because the basic fiber does not deteriorate at low temperature.

Glass paper also has a very low coefficient of expansion which eliminates difficulties resulting from expansion and contraction and since the glass fibers are non-hydroscopic, there is no change in dimensional size resulting from changes in moisture content of the paper. These characteristics are useful in the printing industry. Also, with the glass paper having a hard smooth surface, it is capable of receiving writing and printing.

Attempts at making papers from other synthetic fibers have resulted in products unsuitable for many uses to which paper is adapted as the synthetic fibers have required bonding, either by plasticizing the fibers slightly, or bonding has been obtained by the use of synthetic binders. Papers of this nature, however, are still highly susceptible to deterioration by heat or the bonding agent introduces a foreign substance into the paper which is subject to deterioration or makes it undesirable for use in special applications. The bonding together of smooth surfaced synthetic fibers has, therefore, been a substantial problem in any attempt to produce a true paper from fibers other than natural fibers.

It has been discovered, however, that when glass fibers are produced with diameters such that they approach dimensions of particles of colloidal suspensions, that the glass fibers when placed in a thin mat exhibit characteristics entirely different from those exhibited by glass fibers of larger diameter when placed in mat form. That is to say, that when glass fibers having a diameter of about one micron or less are arranged in a thin mat form, the fibers exhibit felting or matting characteristics and characteristics of surface adhesion that result in a physical interlocking of the fibers together to an extent that a matted or felted web of such glass fibers exhibits substantial tensile strength. This is probably brought about because of the great surface area to weight ratio of the extremely fine glass fibers. The surface area of such fine fibers in a web of any density is so great that there is an actual surface adhesion between the fibers. Also, this result is occasioned because of the diameter to length ratio of the fibers wherein the length of the fiber is 500 to 1000 times the diameter resulting in extreme flexibility of the fiber which permits it to mechanically interlock with the other fibers of like diameter and length.

Also, unlike natural fibers, glass fibers, when properly manufactured, are given the characteristics of uniform diameter and substantially uniform length. Thus a paper made from glass fiber of uniform diameter, of uniform length, exhibits uniform physical, electrical and chemical characteristics as distinguished from non-uniform characteristics of paper made from natural fibers because of the varying diameter and length of the natural fibers.

It is, therefore, an object of this invention to provide a method for producing paper from glass fibers, and particularly to produce paper having good tensile strength and which will have uniform physical, electrical and chemical characteristics.

It is another object of the invention to provide a method for producing glass paper of the kind referred to in the foregoing object wherein the paper is composed of glass fibers having a diameter of substantially one micron or less wherein the fiber diameters approach uniformity and wherein, the length of the fibers also approach uniformity.

It is a further object of the invention to provide a method of making glass paper wherein glass fibers having a diameter of substantially one micron or less are used and the diameter of the glass fibers is held within a range of 0.1 to 1.0 micron.

It is still another object of the invention to provide a method of making a glass paper having a low density as compared with comparable paper made from natural fibers and having a good tensile strength.

It is another object of the invention to provide a method for producing glass paper wherein the glass fibers are collected in a dry condition in the form of a mat and thereafter carried through a body of liquid to condense the mat and accentuate the matting of the fibers.

It is another object of the invention to provide a method of making glass paper wherein fibers other than glass fibers are intermixed with the glass fibers at the time they are collected in a mat or layer form.

It is still another object of the invention to apply a resin solution to the glass fibers at the time they are deposited in a mat or layer-like arrangement.

These and other objects will be apparent from the drawings and the following description.

In the drawings:

Figure 1 is a diagrammatic illustration of apparatus for carrying out the method of producing glass paper according to this invention.

Figure 2 is a diagrammatic illustration of apparatus of a modified arrangement of the apparatus of Figure 1 for incorporating a resin material in the paper.

Figure 3 is a diagrammatic illustration of a further modified arrangement of an apparatus for making paper according to this invention.

Figure 4 is a diagrammatic illustration of apparatus for building up a mat of glass fiber from a thin layer of the fiber.

Figure 5 is a diagrammatic illustration of a press for compressing the mat of glass fiber produced in the apparatus of Figure 4.

Figure 6 is a perspective view of a mat of glass fiber made on the apparatus of Figure 4 illustrating the manner of removing the mat from the apparatus.

Figure 7 is a diagrammatic illustration of apparatus for producing glass fiber of uniform diameter of one micron or less.

Figure 8 is a cross-sectional view of the glass heating and melting chamber of the apparatus of Figure 7.

Figure 9 is a bottom view of the device of Figure 8.

In the manufacture of paper from natural fibers, such as those from the various celluloses, it is recognized in the art that a wide variation in quality as to physical and chemical characteristics of a paper product results from the unpredictable variations in natural fibers. Thus, quality control of papers made from natural fibers is one of the major factors that must be constantly watched and regulated during production of paper. This is particularly true in the production of papers for special applications where uniform quality and physical characteristics of the paper must be carefully retained so as to secure as nearly as possible uniform characteristics in the products in which the paper is used. One such example is paper products for the electronics industry wherein the uniformity of quality of the paper, such as dielectric property, is a major factor in determining whether the electrical components using the paper will have uniform electrical characteristics. There are, of course, many other applications in which uniform quality control of paper is a major factor.

Because of the wide variation in the diameter and length of natural fibers, and because of the inherent natural variation of the fibers themselves, a wide variation in quality of the paper made from such fibers results, such as in physical, chemical and electrical characteristics. The variations in the paper are carried into the electrical components, for example, in which the paper is used, and there is no satisfactory way to overcome the inherent natural variations in the characteristics of the paper made from natural fibers.

A paper made from fibers having uniform diameter and length is capable of exhibiting uniform physical, chemical and electrical characteristics. Such paper is that which can be made from glass fibers according to this invention, the glass fibers having uniform diameter of substantially one micron or less. In any paper made from such glass fibers, the micron diameter size of the fiber from which the paper is made is preestablished and the variation from the established micron size is not permitted to vary more than ±.45 micron. Thus, there is established a uniformity of diameter of the glass fibers that has heretofore been unobtainable in synthetic fibers of any kind, including glass fibers.

In the method of this invention glass fibers having a diameter of substantially one micron or less are produced under controlled conditions such that the fiber diameter does not vary more than ±.45 micron from an established micron size and the length of the glass fiber is also rendered to uniform length. Hence, glass paper made from such fibers exhibits highly uniform physical, chemical and electrical characteristics, such as tensile strength, chemical resistance and dielectric properties.

As a filtering media, paper made of glass fibers having uniform diameter of micron size or less and uniform length is superior to filter media made from natural fiber because of the uniformity of the interstices between the glass fibers. Because of the smallness of the interstices between the glass fibers, an extremely efficient filtering media is produced, in fact one that filters smoke from air.

The glass paper made according to this invention is highly absorbent to liquid and as a result can be saturated with various resins to give to the paper special physical or electrical properties. In fact, such papers have demonstrated their ability to take up as much as twenty-one times their own weight of the saturating solution.

If the uniformity of diameter of glass fibers is not retained with the ±.45 micron range, the paper resulting from use of such non-uniform fibers exhibits the same objectionable variations in physical, chemical and electrical characteristics as that exhibited in papers made from natural fibers. Hence, uniformity of diameter of the glass fibers is of critical importance in the manufacture of a glass paper having uniform physical, chemical and electrical characteristics. Preferably also, the glass fibers shall be substantially of the same length.

Glass fibers having a diameter of one micron or less when incorporated into a paper exhibit the characteristic of self-adhesion, even though the surface of the glass fibers is entirely smooth, resulting in a glass paper having substantial tensile strength.

The self-adhesion is greatly increased by wetting the fiber with an acid water. It has been discovered that each glass of a different glass composition and a different alkaline content has a critical pH value of the water with which it works best. The effect of the correct pH value of the water made acid by any of the common acids, such as hydrochloric and sulphuric for example, is that of obtaining a much greater and a more even dispersion of the glass fiber in the water. The effect is much the same as would be occasioned by the use of a greatly increased quantity of water to disperse the same amount of glass fiber. Also, a more uniform dispersion is obtained to an extent that less bunching of the fibers occurs in the water and the fibers seem to repel one another whereby each fiber is separately dispersed in the water.

It has been discovered that as the alkaline content of the glass is lowered, the acidity of the water in which the glass is dispersed must be increased. Fibers made from a high alkaline glass disperse readily in an acid water having a pH value of about 6.0, whereas the fiber made from a low alkaline glass disperses in the water only when the pH value of the water is reduced to a value in the neighborhood of 2.0. Thus the acid content of the water is inversely proportional to the alkaline content of the glass.

When the fibers are wet with a liquid they compact and felt into a self-adherent pulp-like mass which when dried gives a paper product of good tensile strength. Also, the self-adherent mass can be pressed while wet under any desired pressure which increases the tensile strength of paper product so produced.

To obtain glass fibers of a uniform diameter of one micron or less and retain the diameter of the fibers within a range of ±.45 micron, the conditions under which the glass fibers are produced are critical to the extent that conditions once established must thereafter be maintained constant to hold the sub-micron diameter of the fiber constant. The glass fiber is of the class known as staple fiber, but the diameter to length ratio is exceedingly high with the sub-micron diameter of the fiber providing for extreme flexibility and mechanical strength of the fiber.

In Figures 7, 8 and 9 there is illustrated an apparatus for obtaining glass fibers of one micron in diameter or less. In Figure 7 there is illustrated a heating and melting chamber 10 into which glass marbles are fed from a supply hopper 11. The glass marbles are fed into the heating and melting chamber 10 at periodic intervals governed by the rate of removal of glass from the heating and melting chamber. Since the marbles are approximately ½" in diameter and the heating and melting chamber 10 is approximately 5" in diameter, with the molten glass mass about 2.5" deep, the level of molten glass in the heating and melting chamber is maintained at a constant level since the small amount of glass added by the dropping of a marble into the body of molten glass in the heating and melting chamber is insufficient to cause any noticeable effect on the level of the molten glass in view of the small volume of the marble relative to the volume of the molten glass in the heating and melting chamber.

The heating and melting chamber 10 is more particularly illustrated in Figures 8 and 9 wherein it is illustrated as consisting of an inner metal chamber 12 that is circular or cylindriral in shape. The chamber 12 is preferably constructed of platinum to resist the action of the molten glass contained within the chamber.

The bottom wall 13 of the chamber 12 contains a plurality of openings 14 through which molten glass exudes from the chamber 12. These openings 14 are arranged in circular rows near the periphery of the chamber 12 as illustrated in Figure 9. A heating coil 15 is placed around the exterior of the chamber 12 and is adapted for connection to a source of high frequency energy which may, for example, be an electronic high frequency oscillator, or a high frequency generator. The heating coil 15 is placed substantially at the glass melting level of the molten glass in the chamber 12 to effect uniform heating conditions throughout the body of the molten glass in the heating chamber or pot 10. The heating chamber 12 is preferably surrounded with a ceramic heat insulating material 16 to conserve heat therein.

It has been determined over a long period of experimentation and manufacture of glass fibers that the heating of glass by the use of a high frequency current in a heating coil that is placed around a circular heating chamber and positioned uniformly around the chamber results in obtaining absolute uniformity of viscosity of the molten glass throughout its entire mass within the heating chamber.

With the level of the molten glass maintained constant within the heating chamber 12 and with the viscosity of the molten glass absolutely uniform throughout the entire mass thereof, there is effected identically the same head of glass above each opening 14 in the bottom wall of the heating chamber 12 at a viscosity of exactly the same as that which occurs in the head of glass above every other opening in the bottom wall of the heating chamber. The head of glass above each of the openings is exactly the same because of the parallel placement of the bottom wall of the heating chamber relative to the level of molten glass therein. As a result, exactly the same quantity of molten glass is exuded through each of the openings 14 from the heating chamber 12.

The head of glass above the openings 14 establishes a uniform pressure differential between opposite sides of the body of the glass to cause the glass to exude through each of the openings at a constant rate in constant volume. However, a positive pressure can be established above the body of molten glass in the chamber 12 should it be desirable to obtain a flow rate of the molten glass through the openings 14 greater than that occasioned by the normal head.

The streams of molten glass from the chamber 12 cool quickly so that solidified glass fibers can be passed between the drawing rolls 17 and 18 for drawing of the molten glass as it leaves the chamber 12 into the fine fibers that pass between the drawing rolls 17 and 18. The glass fibers 19 pass over a guide 20 having a recess to receive each of the fibers whereby the fibers are arranged in planar relationship for entry to between the drawing rolls 17 and 18. The drawing rolls are preferably of a rubber-like material to frictionally engage the glass fibers 19 whereby to pull them downwardly from the heating chamber 12.

The drawing rolls 17 and 18 are driven by a suitable mechanical apparatus to rotate them at a constant speed which is controlled to establish the diameter of the drawn glass fiber 19 at a predetermined and fixed value, for example, 0.005 to 0.007 inch.

With the flow of molten glass from the heating chamber 12 being at a uniform controlled rate from each of the openings 14, and with the drawing rolls 17 and 18 simultaneously drawing each of the molten strands into glass fiber from molten glass of exactly the same viscosity flowing at exactly the same rate, the drawn diameter of each of the primary glass fibers 19 will be exactly the same within but very minor limits of .0005 inch.

The primary glass fibers 19 are advanced by the drawing rolls 17 and 18 over the flat face 21 of a guide block 22 having a V-shaped edge 23.

In horizontal alignment with the V-shaped edge 23, there is provided a gas burner 24 that has a horizontal discharge slot 25 through which a high temperature high velocity gas blast is discharged directly at the ends of the glass fibers 19 below the edge 23 of the block 22. The high temperature gas blast melts the ends of the fibers 19 and the high velocity of the blast causes the molten glass from each of the fibers 19 to be blown from the end of the fiber and simultaneously therewith drawn into a glass fiber of extremely fine diameter of one micron or less.

With the primary glass fibers 19 having a diameter of from 0.002 to 0.007 inch, and with the high temperature high velocity gas blast having a temperature of 3300° F. or higher and a velocity of 1600–2000 ft./sec., glass fibers of 0.04 to 1.0 micron in diameter are produced.

By controlling the diameter of the primary glass fiber 19, the rate of feed, temperature and velocity of the burner gas at discharge slot 25, the diameter of the drawn staple fiber can be varied.

With the primary glass fibers 19 being fed uniformly into a burner blast of uniform temperature and velocity, the ends of the primary glass fibers are all rendered molten at the same rate with the result that the staple fiber blown from the ends of the primary glass fibers is of relatively uniform length, as well as being uniform in diameter.

Thus, under controlled conditions, staple fiber having a diameter of one micron or less is obtained with controlled uniformity of diameter and length of the staple fiber.

The staple glass fiber thus formed is deposited on a porous wire belt 40 that passes over the rolls 41 and 42, the roll 42 being driven by an electric motor 43 through a belt 44. A suction chamber 45 is placed on one side of the belt 40 to draw the glass fiber against the belt during deposition of the glass fiber on the belt.

The glass fiber deposited on the outer face of the belt 40 forms a loose web 50 of the glass fiber of uniform diameter of one micron or less. This web 50 is removed from the belt 40 at one end thereof and is passed to a carrier belt 51 that is preferably of a fabric material. The web 50 is supported on the carrier belt 51 through a body of liquid 52 within the container 53. Since the web 50 is of a loose fluffy character when delivered from the belt 40 and has little tensile strength, the belt 51 will support the web 50 while it is wet and thus prevent the web 50 from tearing or distorting.

The web 50 impregnated with the liquid in the container 53 is then picked up by a fabric belt 55 that carries the wet web between press rolls 56 to condense the web to a more compact structure which will support its own weight upon leaving the web 55.

Upon leaving the web 55, the web 50 passes over a drier cylinder 57 that has a fabric belt 58 passing around the same to retain the web 50 in engagement with the face of the heating cylinder 57. The heating cylinder is heated by any suitable source of heating such as a steam pipe 59.

Upon leaving the heating cylinder 57, the web 50 is dry and is rolled into a supply roll 60, the web now being in condition for use as paper.

The belts 51, 55 and 58 are driven by the drier cylinders 61, 62 and 63 respectively all connected with the drive motor 43 by means of belts 64, 65 and 66. The supply roll 60 is driven by the belt 67.

If desired, fibers other than glass fiber can be intermixed with the glass fiber at the time it is deposited on the belt 40. This can be accomplished by means of the blower 70 which can be supplied with fiber of any suitable type for blowing onto the wire belt 40 simultaneously with deposition of the glass fiber thereon to obtain thorough intermixing of the fiber at the time of deposition.

The apparatus illustrated in Figure 2 is like the apparatus disclosed and described in Figure 1 with the exception that the liquid in the container through which the glass web is drawn contains a suitable resin for impregnating the web to give to it increased tensile strength and impart characteristics of the resin to the web. Thus, the elements of Figure 2 that are like the elements of Figure 1 are given corresponding reference numerals but with the suffix $a$ added thereto.

With the liquid 52a in the container 53a being a resin, some form of heating is required to set the resin in the paper web 50a. For this purpose, a heating chamber 80 is provided to receive the web 50a after it leaves the pressing rolls 56a. The web 50a is carried between a series of press rolls 81 and 82 to apply pressure to the web to condense it and render the web with a smooth surface. Concurrently with the application of pressure to the web by the rolls 81 and 82, the web is heated by means of heating elements 83 and 84 in the heating chamber 80 to set the resin in the web. The elements 83 and 84 may be electric heaters.

The dry web with the resin set therein is then deposited from the heating chamber 80 and wound into the supply roll 60a.

It will, of course, be understood that all of the belts that carry the web 50 of Figure 1 or the web 50a of Figure 2 operate at a uniform rate of linear movement to avoid stretching and tearing of the web. Also, the liquid in the container 53 is preferably an acid water to increase the tensile strength of the web.

In Figure 3 the glass fiber of uniform diameter of one micron or less produced in the apparatus heretofore described with reference to Figures 7, 8 and 9 is deposited on the wire belt 90 as a web 91. Simultaneously with deposition of the glass fiber, the fiber is wet with a resin spray 92 which condenses the fiber directly onto the belt 90 so that the resin impregnated web 91 can pass to the heating chamber 80b which is identical to the heating chamber 80 heretofore described with reference to Figure 2. The belt 90 is driven by the electric motor 93 through the belt 94 and the web 91 is carried through the heating chamber by support belts 95 and 96 as driven through the belt 97 from the electric motor 93. The finished web is delivered to the supply roll 98.

In Figure 4 the apparatus is like that described with reference to Figure 3 except that the heating chamber 80b is dispensed with and the web 91 is delivered onto a rotating cylinder 100 so that a plurality of layers of the web are wound onto the cylinder 100 forming a mat 101 of thickness substantially greater than the web 91.

This resin impregnated mat 101 is then slit longitudinally of the cylinder 100 as illustrated in Figure 6 so that the mat 101 can be placed between the flat plates 102 and 103 of the press 104. The plates 102 and 103 apply pressure to the mat 101 to compress the same under pressure and the plates 102 and 103 are suitably heated to set the resin in the mat 101 while under pressure.

It will be understood that other fiber can be introduced with the glass fiber through the blower 70b shown in Figures 3 and 4 in the same manner as introduced by the blower 70 of Figure 1.

While the method and apparatus disclosed and described herein constitutes the preferred illustration and description of the invention, yet modifications can be made without departing from the spirit of the invention, and that those modifications that fall within the scope of the appended claims are intended to be included herein.

I claim:

1. A method of making glass paper which comprises the steps of flowing molten glass under substantially constant head and constant viscosity through openings of uniform size to establish uniformly flowing streams of molten glass, drawing and attenuating the said streams of molten glass simultaneously and at the same rate to produce continuous lengths of glass filaments which are of substantially uniform diameter, directing the said glass filaments into a blast of hot gas which melts the ends of said glass filaments causing the same to be disintegrated into staple glass fibers, said glass fibers having a diameter of not greater than one micron and varying not more than plus or minus 0.45 micron throughout the fibrous mass, collecting said glass fibers on a supporting web in the form of a matted layer of glass fibers, passing said layer through an aqueous acid bath having a pH between about 2 and 6 to accentuate the matting of the fiber and to form a dense compact layer of glass fibers, removing the thus treated layer from said bath, draining off excess liquid therefrom, and subjecting the resultant layer to heat to dry the same and produce a finished glass paper.

2. A method of making a glass fiber paper article as in claim 1 which includes the steps of depositing glass fibers of substantially uniform diameter and not greater than one micron in a matted layer and on one side of a foraminous web, impregnating said layer with resin, and rolling up the thus treated glass fiber layer to form a mat of substantially greater thickness than said layer, compressing the mat to increase its density and heating the compressed mat to cure the resin and form a finished glass fiber mat made up of glass fiber paper.

3. A method of making glass paper as in claim 1 which includes the steps of depositing glass fibers of uniform diameter and on the order of a fraction of a micron onto a foraminous web, removing the deposited layer of glass fibers while supporting the same and impregnating the said layer with resin to form a matted layer of glass fibers bonded with resin, and thereafter compressing the layer while concurrently heating the same to increase its density and cure the resin to produce a finished glass fiber paper.

4. A method of making glass paper which comprises the steps of flowing molten glass under substantially constant head and constant viscosity through openings of uniform size to establish uniformly flowing streams of molten glass, drawing and attenuating the said streams of molten glass simultaneously and at the same rate to produce continuous lengths of glass filaments which are of substantially uniform diameter, directing the said glass filaments into a blast of hot gas which melts the ends of said glass filaments causing the same to be disintegrated into staple glass fibers, said glass fibers having a diameter of not greater than one micron and varying not more than plus or minus 0.45 micron throughout the fibrous mass, collecting said glass fibers on a supporting web in the form of a matted layer of glass fibers, passing said layer through an acidulous bath to accentuate the matting of the fiber and to form a dense compact layer of glass fibers, removing the thus treated glass fibers from the bath, draining off excess liquid therefrom, and subjecting the resultant glass fiber layer to heat to dry the same.

References Cited in the file of this patent

UNITED STATES PATENTS

| Number | Name | Date |
|---|---|---|
| 2,489,242 | Slayter et al. | Nov. 22, 1949 |
| 2,574,221 | Modigliani | Nov. 6, 1951 |
| 2,581,069 | Bertolet | Jan. 1, 1952 |